US007387348B2

(12) United States Patent
Archer et al.

(10) Patent No.: US 7,387,348 B2
(45) Date of Patent: Jun. 17, 2008

(54) PUMP AND ROLL SYSTEM FOR A VEHICLE

(75) Inventors: David W. Archer, Hortonville, WI (US); David J. Vander Galien, Van Dyne, WI (US)

(73) Assignee: Oshkosh Truck Company, Oshkosh, WI (US)

( * ) Notice: Subject to any disclaimer, the term of this patent is extended or adjusted under 35 U.S.C. 154(b) by 413 days.

(21) Appl. No.: 11/055,962

(22) Filed: Feb. 11, 2005

(65) Prior Publication Data

US 2006/0180322 A1 Aug. 17, 2006

(51) Int. Cl.

*B60T 13/74* (2006.01)
*B60T 13/22* (2006.01)
*B60K 25/00* (2006.01)

(52) U.S. Cl. ........................... 303/20; 303/71; 303/89; 180/53.5

(58) Field of Classification Search ................. 303/20, 303/71, 89, 191, 198, 10; 701/93, 97; 180/53.4, 180/53.6, 53.8, 53.5; 188/170, 265; 169/24
See application file for complete search history.

(56) References Cited

U.S. PATENT DOCUMENTS 2,304,560 A * 12/1942 Freeman ..................... 188/170
4,157,733 A 6/1979 Ewers et al.
4,170,264 A 10/1979 Gibson
4,189,043 A 2/1980 Steinhagen
4,442,730 A 4/1984 Snoy
5,722,737 A 3/1998 Cooper et al.
6,290,309 B1 * 9/2001 Korn .......................... 188/170
6,322,161 B1 * 11/2001 Maslonka et al. ............ 303/89
6,450,587 B1 * 9/2002 MacGregor et al. .......... 303/89
6,655,749 B2 12/2003 Bond, III et al.
6,766,863 B2 7/2004 Arvidson et al.
2002/0094903 A1 7/2002 Bratel et al.
2003/0163228 A1 8/2003 Pillar et al.
2003/0163229 A1 8/2003 Pillar et al.
2003/0163230 A1 8/2003 Pillar et al.
2003/0171854 A1 9/2003 Pillar et al.
2004/0069865 A1 4/2004 Rowe et al.
2004/0124697 A1 7/2004 MacGregor et al.

OTHER PUBLICATIONS

TD61-1180 Series for ARFF Vehicles, Twin Disc Automatic Transmission Systems, bearing a date indication of © 2000, (2 pgs.).
International Search Report for International Application No. PCT/US06/04700, mailing date Oct. 5, 2007.

* cited by examiner

*Primary Examiner*—Thomas J Williams
(74) *Attorney, Agent, or Firm*—Foley & Lardner LLP

(57) ABSTRACT

A system is provided for permitting movement of a vehicle having brakes while an auxiliary component of the vehicle is operated by the vehicle. The system includes a pressurized fluid source. A control device is coupled to the pressurized fluid source and the brakes of the vehicle to release the brakes in response to a first signal and to at least partially apply the brakes in response to a second signal. A controller applies the first signal to the control device when at least one of a first set of conditions exist and applies the second signal to the control device when a second set of conditions exist.

34 Claims, 3 Drawing Sheets

PUMP AND ROLL SYSTEM FOR A VEHICLE

FIELD

The present invention relates to a pump and roll system for use in an emergency response vehicle, and more particularly to a braking system for pump and roll operation of an aircraft rescue and fire fighting (ARFF) vehicle that permits movement of the ARFF during operation of a fire suppression pump.

BACKGROUND

It is generally known to provide emergency response vehicles such as fire fighting vehicles for responding to fires on equipment, such as moving equipment (e.g. aircraft or the like, etc.). The vehicles are typically equipped with pumps that are driven at a predetermined speed (e.g. 2300 rpm, etc.) by the drive train or system of the vehicle for delivering a fire fighting agent or suppressant to the aircraft. Conventional fire fighting vehicles that use a pump operated by the vehicle drive train tend to have limited mobility because the drive train output (power) is directed away from the wheels of the vehicle for operation of the pump. The limited mobility of conventional fire fighting vehicles tends to reduce their effectiveness in fighting certain fires because the vehicle is usually inhibited from “following” a moving target or repositioning about a stationary target to continuously deliver a fire suppression agent from various advantageous angles of attack.

Certain systems have been developed to permit limited movement of a fire fighting vehicle during operation of the pump (e.g. slow rolling or “creeping” movement of the vehicle in a “pump and roll” mode of operation). However, such systems tend to have certain disadvantages. For example, such known pump and roll systems typically use a component of the vehicle’s drive system (such as a transmission) to redirect a portion of the drive train output from the pump to the wheels of the vehicle, however, when an operator desires to stop the vehicle during operation of the pump, the operator usually has to manually apply the brakes, resulting in an additional operation by the operator and a potential distraction from the operator’s attention on fighting the fire.

Accordingly, it would be desirable to provide a system for movement of a fire fighting vehicle during operation of a fire suppression pump. It would also be desirable to provide a system to permit movement of the vehicle while the vehicle drive train is used to operate auxiliary equipment (such as a pump for a fire suppression agent). It would also be desirable to provide a system for pump and roll operation of the vehicle that does not significantly reduce the speed of the pump. It would be further desirable to provide a system that permits operation of the vehicle in a pump and roll mode of operation through use of the braking system of the vehicle. It would be further desirable to provide a system that permits the vehicle to move slowly during a pump and roll mode when the vehicle’s accelerator is actuated (e.g. “depressed”) and that stops movement of the vehicle when the accelerator is released without the operator having to separately apply the brakes of the vehicle.

Accordingly, it would be desirable to provide a pump and roll system for a vehicle having any one or more of these or other desirable features.

SUMMARY

One embodiment of the invention relates to a system for permitting movement of a vehicle having brakes while an auxiliary component of the vehicle is operated by the vehicle. The system includes a pressurized fluid source and a control device coupled to the pressurized fluid source and the brakes of the vehicle to release the brakes in response to a first signal and to at least partially apply the brakes in response to a second signal. A controller applies the first signal to the control device when at least one of a first set of conditions exist and applies the second signal to the control device when a second set of conditions exist.

Another embodiment of the invention relates to a system for a vehicle having wheels with a brake and an engine-driven auxiliary unit. The system includes a first supply line having a first pressure and a second supply line having a second pressure. A control device has a first inlet interfacing with the first supply line and a second inlet interfacing with the second supply line. The control device includes an outlet interfacing with the brake device. A controller provides one of a first signal and a second signal to the control device to transmit one of the first pressure and the second pressure to the brake device so that the brakes are movable between a first position to permit movement of the vehicle and a second position to arrest movement of the vehicle during operation of the auxiliary unit.

A further embodiment of the invention relates to a vehicle having an engine-driven pump and a brake device. The vehicle includes a tubing network interconnecting a pressure source to an inlet of a control device and interconnecting an outlet of the control device to the brake device. A controller interfaces with the control device for operation between a first position to release the brake device and permit movement of the vehicle when at least one of a first set of conditions representative of the pump and the vehicle are present, and a second position to at least partially apply the brake device to arrest movement of the vehicle when a second set of conditions representative of the pump and the vehicle are present.

A further embodiment of the invention relates to a pump and roll system for a vehicle having an accelerator device and a brake device configured for operation by an operator of the vehicle. The system includes a pressurized fluid source and a control device coupled to the pressurized fluid source and the brakes of the vehicle. The control device is configured to operate between a first position to release the brakes for movement of the vehicle in a pump and roll mode when the accelerator device of the vehicle is actuated and a second position to at least partially apply the brakes to stop the vehicle when the accelerator device is released, so that the operator can stop the vehicle following movement in the pump and roll mode by releasing the accelerator device without actuating the brake device.

DETAILED DESCRIPTION

Referring to the FIGS. a system 10 for operating a vehicle 12 in a pump and roll mode is shown according to one embodiment. It should be noted that the embodiment is described and illustrated as a fire fighting vehicle such as an aircraft rescue and fire fighting vehicle (ARFF) having auxiliary driven equipment shown as a pump 14 for delivering a fire suppression agent or the like to a target (shown as an aircraft 16). However, the system for a vehicle is suitable for use with any vehicle having auxiliary equipment (e.g. electric generators, hydraulic motors or equipment, rotating or reciprocating members, etc.) configured for operation by a drive train or other power delivery system of the vehicle, where movement for repositioning of the vehicle is desired during operation of the auxiliary equipment. Accordingly, all such variations are included.

The system to permit pump and roll operation of the vehicle as illustrated in the FIGS. permits operation of the vehicle's braking system in a conventional manner when the auxiliary equipment (e.g. pump, etc.) is not operating by opening a logic device and maintaining the availability of a first "full" pressure to the parking brake cylinder of the brake system. The system operates in connection with the vehicle's braking system when the auxiliary equipment is operating, by using the vehicle's brake system for implementing pump and roll operation through the application of the components shown to include a controller including an electric circuit and logic devices, a control device, a pressure regulating device and a pressure relief device.

Figure 1:
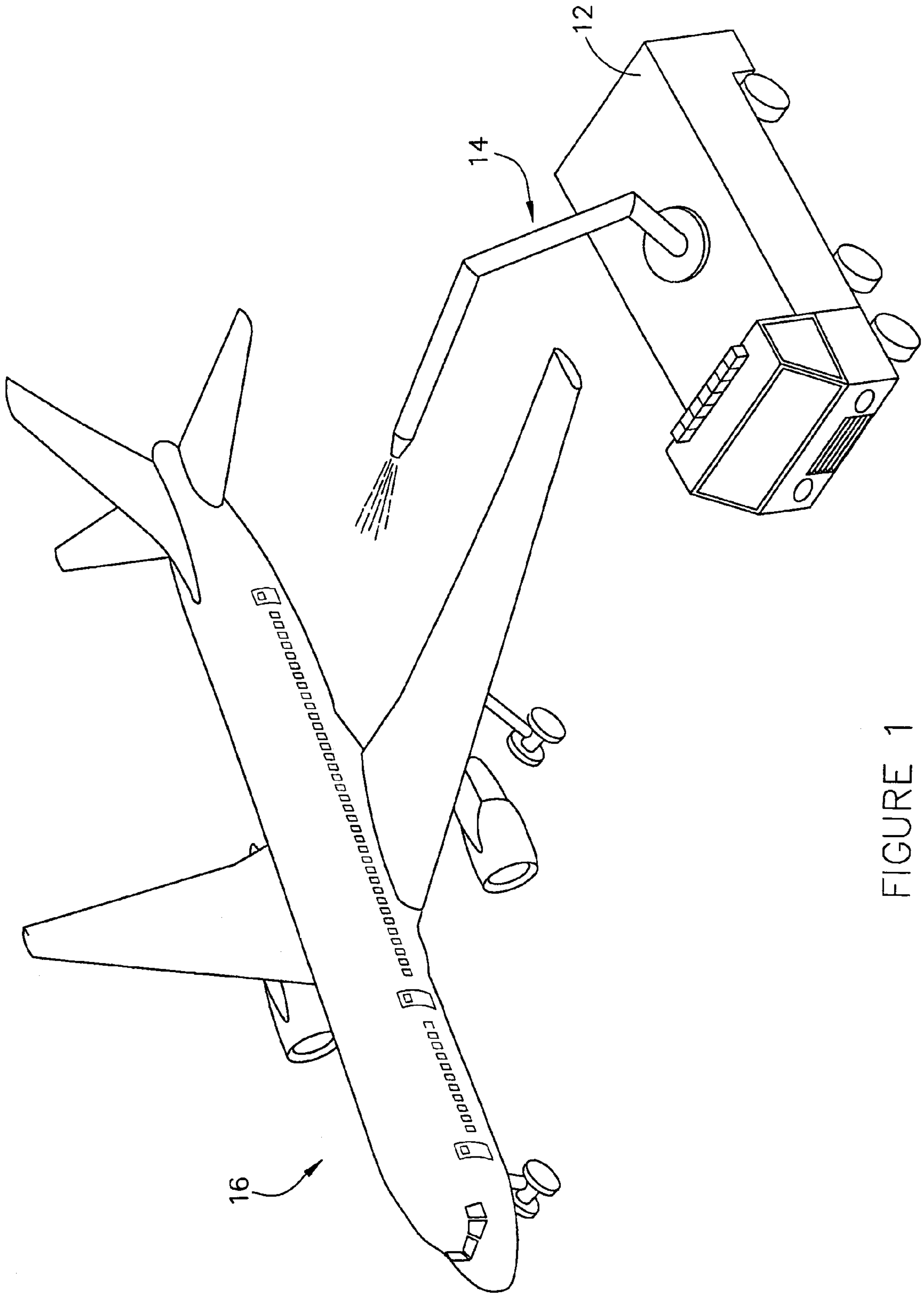
FIG. 1 is a schematic drawing of a vehicle with auxiliary driven equipment operating in a pump and roll mode according to an embodiment.
Figure 2A:
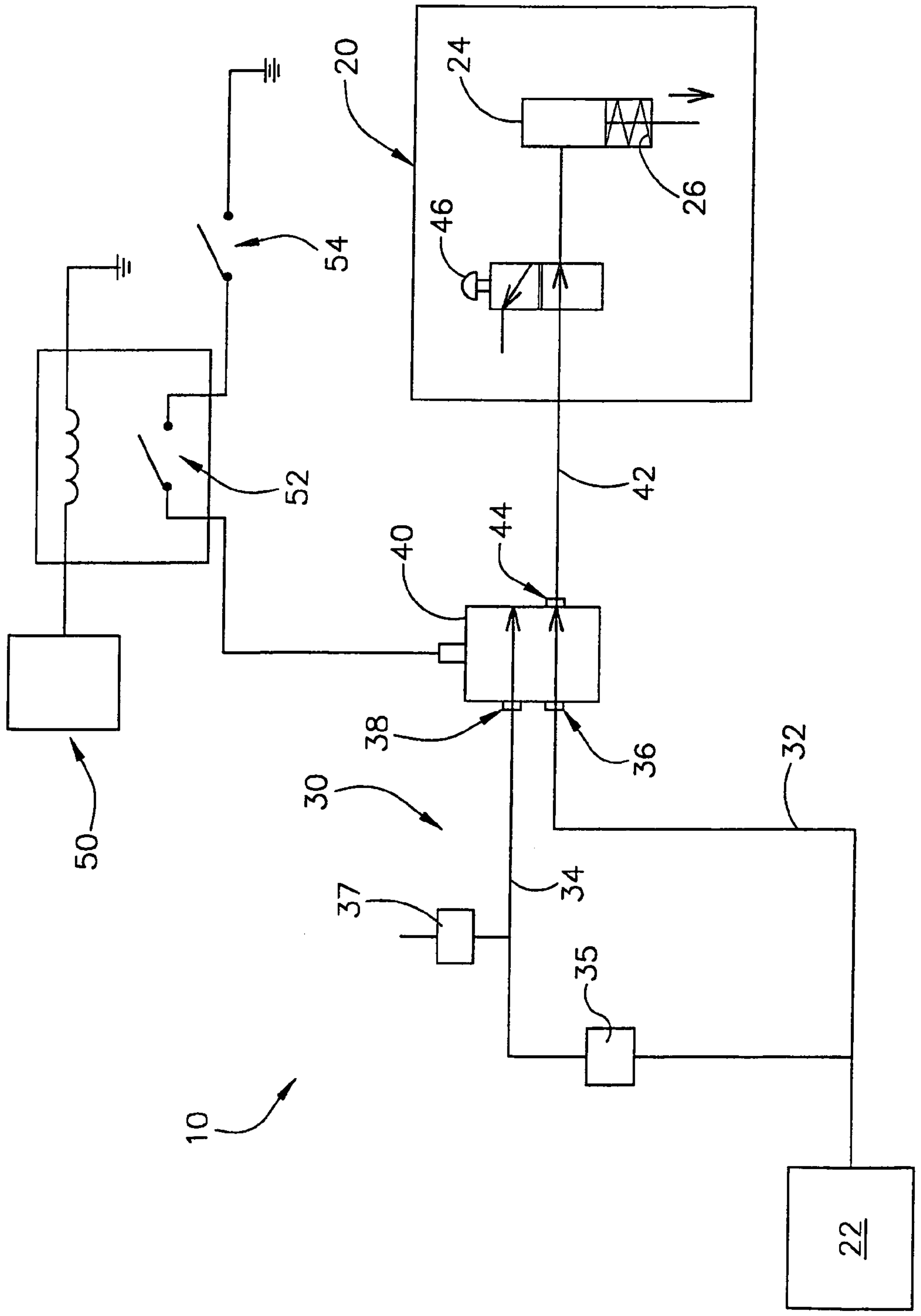
FIG. 2A is a schematic diagram of a system for operation of a vehicle in a pump and roll mode with brakes released according to an embodiment.
Figure 2B:
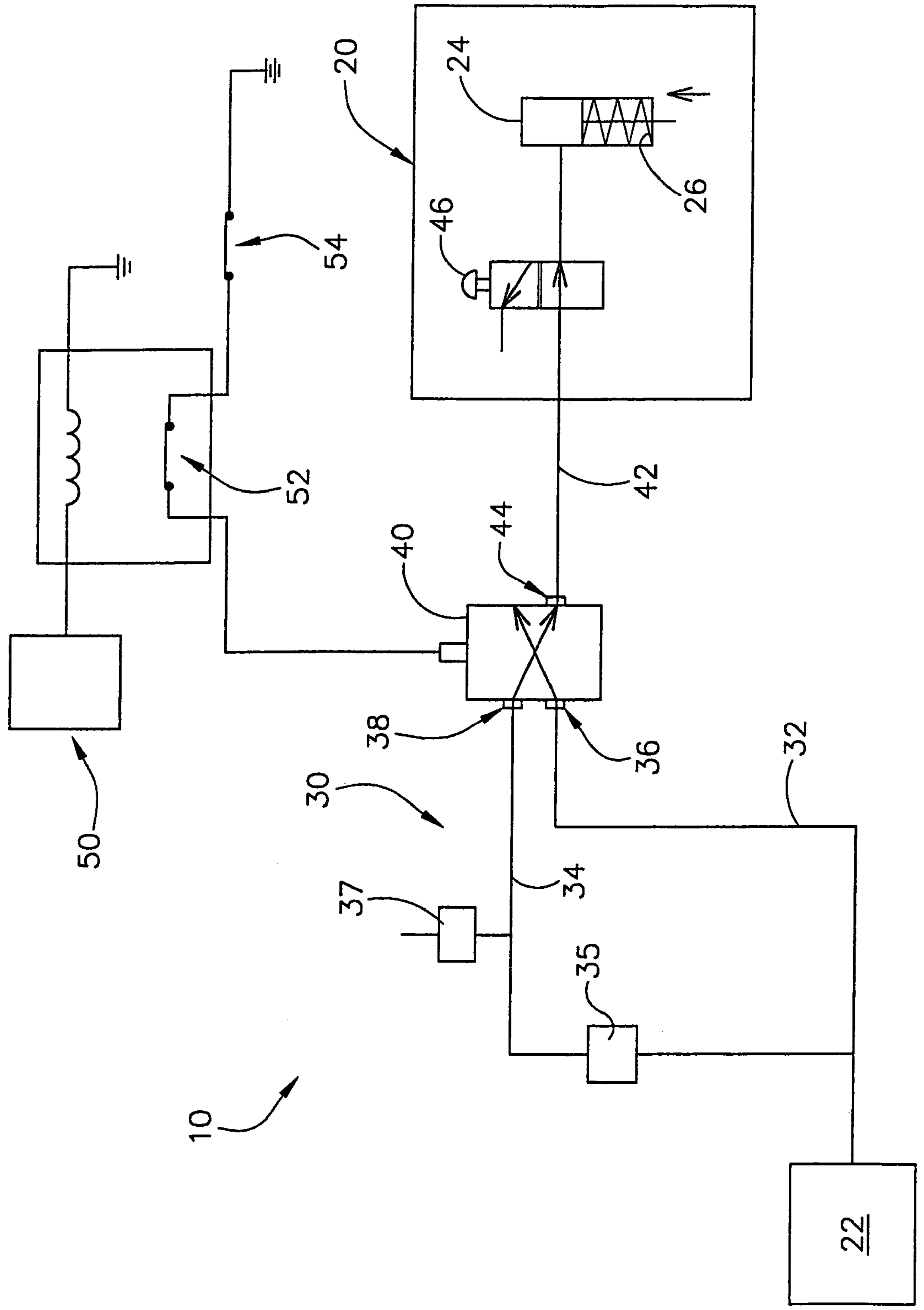
FIG. 2B is a schematic diagram of a system for operation of a vehicle in a pump and roll mode with brakes activated according to an embodiment.

Referring to FIG. 2A-2B, the system 10 for operating a vehicle in a pump and roll mode is shown integrated with a pneumatic braking system 20 of vehicle 12. The braking system 20 interfaces with a source of pneumatic pressure 22 (e.g. accumulator, reservoir, tank, etc.) from the vehicle. The source of pneumatic pressure 22 is interconnected to pneumatic braking system 20 which includes standard brakes (such as spring brakes) for the wheels of the vehicle and a standard parking brake operated by a pneumatic parking brake cylinder 24 that is shown as spring-biased toward a brake-applied position (i.e. parking brake applied on loss of air pressure) by a spring 26.

The pneumatic medium from the source of pressure may be air, or other suitable gas and is maintained at the vehicle's pneumatic system pressure configured to provide a "first (full) pressure" within a range of approximately 100-140 pounds per square inch (psi) and more particularly at about 130 psi but may be any suitable pressure or range of pressures corresponding to the operational requirements of the brake system 20. The system 10 is shown configured in a manner for release of the parking brake when the first (full) pressure from the source of pneumatic pressure 22 is provided to the parking brake cylinder 24 (see FIG. 2A). According to an alternative embodiment, the system may be configured to release the parking brake upon loss of pneumatic pressure. According to another alternative embodiment, the braking system may be configured as a hydraulic braking system. According to a further alternative embodiment, the system may be configured for operation with the "main" brakes of the vehicle's brake system.

The system 10 is shown to include a piping system 30 having conduits (e.g. lines, tubing, piping, fittings, etc.) that interconnect the components of the system. A first pneumatic supply line 32 from the source of pressure 22 is routed to a first input 36 of a pressure control device 40 (e.g. solenoid valve, mode switch, etc.). A second pneumatic supply line 34 from the source of pressure 22 is routed through a pressure regulating device 35 (e.g. pressure regulator, pressure control valve, etc.) and a pressure relief device 37 (e.g. relief valve, etc.) to a second input 38 on the control device 40. Piping system 30 is further shown to include an outlet line 42 connecting an output 44 of control device 40 through a parking brake valve 46 to the parking brake cylinder 24. The parking brake valve 46 and parking brake cylinder 24 are typical components of a conventional pneumatic brake system for a vehicle such as an ARFF. The conduits may be formed from any suitable material such as copper, aluminum, steel, stainless steel, etc. and are intended to provide a substantially leak-tight flow path or network for interconnecting the various pneumatic devices for operation of the system.

The pressure regulating device 35 is intended to reduce the pneumatic supply pressure to a "second (reduced) pressure" within a range of approximately 20-40 psi and more particularly within a range of about 30-35 psi and is intended to provide a sufficiently reduced pressure to the parking brake cylinder 24 to permit spring force from spring 26 to partially apply (e.g. "drag," "modulate," etc.) the vehicle's brakes and stop the vehicle in a "smooth" manner when the vehicle operator "releases" the vehicle's accelerator pedal during the pump and roll mode of operation. The pressure range may be adjusted, or the system may be provided with capability for adjustment, so that the brakes are applied in a relatively smooth manner to arrest the vehicle within a desired time or distance. The second (reduced) pressure provided by pressure reducing device 35 is intended to minimize the tendency for "abrupt" stops that may occur if all pressure is relieved (e.g. vented, dumped, etc.) from the parking brake cylinder 24. Pressure relief device 37 is intended to prevent excessive pressure from accumulating or building in the second supply line 34 so that the pressure remains sufficiently low to permit spring force in the parking brake cylinder to apply the vehicle's brakes in a desired manner. According to a preferred embodiment, pressure relief device 37 is a relief valve having a setpoint of approximately 35 psi (or other suitable pressure corresponding to a small margin above the second (reduced) pressure). In the event that the pressure relief device activates, the pressure regulating device is intended to restore the pressure in the first pneumatic supply line as needed.

Control device 40 is shown having a first inlet 36 that receives the first (full) pressure from first pneumatic supply line 32 and a second inlet 38 that receives the second (reduced) pressure from the source of pressure 22 via the pressure regulation device 35. According to one embodiment, the control device 40 is a solenoid valve configured to change state between a first position (drive mode or pump and roll mode with parking brake released) (see FIG. 2A) and a second position (parking brake applied for stopping the vehicle during the pump and roll mode) (see FIG. 2B). In the first position for releasing the parking brake (as shown in FIG. 2A), the second inlet 38 providing the second (reduced) pressure is blocked (e.g. closed, plugged, shut-off, etc.) and the first inlet 36 providing the first (full) pressure is open to the outlet 44 of control valve 40 so that the first (full) pressure is applied to the parking brake cylinder 24 to overcome the spring force and release the vehicle's brakes to permit pump and roll operation of the vehicle. In the second position for applying the parking brake (see FIG. 2B), the first inlet 36 providing the first (full) pressure is blocked and the second inlet 38 providing the second (reduced) pressure is open to outlet 44 of control valve 40 so that the second (reduced) pressure is applied to parking brake cylinder 24 to permit partial application of the vehicle's brakes by the spring force in a manner sufficient to smoothly arrest movement of vehicle 12 in a controlled manner. According to a preferred embodiment, control valve 40 and pressure regulator device 35 and pressure relief device 37 may be provided as an integrated unit or assembly such as commercially available from Neff Engineering of Appleton, Wis. as part number MAC 6314D-611-PP-601DA=4291-9-PR63D-14AA-7130-9. According to an alternative embodiment, the control device may be any suitable component, such as a servo valve, etc.

Referring further to FIGS. 2A-2B, the system further includes a controller 50 including an electric circuit for operation of vehicle 12 in a pump and roll mode when certain condition(s) are satisfied. When certain condition(s) exist, the logic sequence (shown as logic devices 52 and 54 configured in series) arrests movement of the vehicle (or prevents initiating movement of the vehicle) by reducing the pneumatic pressure to parking brake cylinder 24 so that sufficient spring force exists to apply the vehicle's brake (see FIG. 2B). When other conditions exist, the logic sequence permits release of the brakes by increasing pneumatic pressure to parking brake cylinder 24 to overcome the spring force so that the vehicle can "move" (e.g. be driven, etc.) in a pump and roll mode (see FIG. 2A).

The conditions may be any suitable conditions indicative of a desire to operate the vehicle in a pump and roll mode. According to one embodiment, a first condition and a second condition are related to the state of the auxiliary equipment. A first condition is that the auxiliary equipment 14 (shown as a pump) is not operating (e.g. not pumping, etc.) and corresponds to logic device 54 in the "open" or "off" position (see FIG. 2A). A second condition is that the auxiliary equipment is operating (e.g. pumping, etc.) and corresponds to logic device 54 in the "closed" or "on" position (see FIG. 2B). The first and second conditions as may be indicated by contacts from a pump "on/off" switch (e.g. on an instrument panel of the vehicle, etc.) associated with logic device 54. However, the first condition and the second condition may be indicated by any suitable parameter (e.g. pump speed, pump flow, etc.) and through any suitable device (e.g. microprocessor, etc.) so that the pump and roll system is operational when the pump is operating.

A third condition and a fourth condition are related to a "throttle position" of the vehicle. The throttle position may be indicated by any suitable device or sensor capable of detecting speed or acceleration demand to the vehicle as requested by a user (i.e. throttle linkage position, accelerator foot-pedal position, fuel injector demand signal, etc.). According to one embodiment, the vehicle's throttle position is detected by a device such as a microprocessor 50 associated with logic device 52. The third condition is that the vehicle's throttle position exceeds a predetermined point or position indicating that an operator of the vehicle desires to move the vehicle while the pump is operating. According to one embodiment, the third condition exists when the throttle position exceeds about 5 percent of a "full open" throttle position (i.e. a "throttle actuated" position) and corresponds to logic device 52 in the "open" or "off" position (see FIG. 2A). The fourth condition exists when the throttle position is equal to or less than about 5 percent of the full-open throttle position (i.e. a "throttle released" position) and corresponds to logic device 52 in the "closed" or "on" position (see FIG. 2B). However, the actual position corresponding to the throttle actuated and throttle released positions may be adjusted according to use with any particular type of system and vehicle.

As shown in FIGS. 2A-2B, the controller 50 will provide a first signal (e.g. 0 volts DC) to de-energize control device 40 for positioning in the first (parking brake released) position where the first (full) pressure is applied to parking brake cylinder 24 to pressurize the parking brake cylinder and release the parking brake to permit movement of the vehicle when at least one of a first set of conditions comprising the first condition (auxiliary equipment stopped) and the third condition (throttle actuated) exist.

As further shown in FIGS. 2A-2B, the controller 50 will provide a second signal (e.g. 12 volts DC) to energize control device 40 for positioning in the second (parking brake applied) position (see FIG. 2B) where the second (reduced) pressure is directed to parking brake cylinder 24 to permit spring activation of the parking brake and stop the vehicle when a second set of conditions comprising the second condition (auxiliary equipment operating) and the fourth condition (throttle released) exist. According to alternative embodiments, the logic sequences may be reversed or otherwise varied and the operation of the control device may be reconfigured (e.g. energize to open, energize to close, etc.).

According to the illustrated embodiment of FIG. 2B, when the vehicle's pump is operating (e.g. second condition exists) and the throttle position corresponds to a "throttle released" position (e.g. fourth condition exists) the logic devices 52 and 54 are closed and the sequence is "made up" and controller 50 applies a second signal (e.g. 12 volts DC) to control valve 40 for placement of the control valve in the second (parking brake applied) position to direct the second (reduced) pressure to parking brake cylinder 24 so that the spring force is sufficient to apply the vehicle's brakes for stopping the vehicle in a controlled manner (or so that the vehicle remains stationary).

When the pump is operating (e.g. second condition exists—logic device 54 closed) and the throttle position corresponds to a "throttle actuated" position (e.g. fourth condition exists—logic device 52 open), controller 50 applies a first signal to control valve 40 (e.g. 0 volts DC) for placement of the control valve in the first (parking brake released) position (see FIG. 2A) to direct the first (full) pressure to parking brake cylinder 24 to release the vehicle's brakes and permit the vehicle to move in the pump and roll mode.

According to the illustrated embodiment, when the vehicle is moving in a pump and roll mode and the operator subsequently "releases" the throttle, logic device 52 recloses and the parking brake is partially applied in a "dragging" manner to arrest movement of the vehicle. Accordingly, an operator of the vehicle may operate vehicle 12 in the pump and roll mode by simply depressing the vehicle's throttle while pump 14 is operating; and may stop the vehicle by simply releasing the throttle. This simplified mode of operation is intended to reduce the complexity of operation of the vehicle during pump and roll to permit the operator to better focus on responding to the emergency.

According to alternative embodiments, the logic arrangement may include other, or additional, conditions including, but not limited to an indication that an operator of the vehicle is present (such as may be provided by a seat occupancy sensor, seat belt sensor, etc.). The logic sequence may comprise contacts from switches, relays, contactors, etc. and may include analog or digital inputs from microprocessors, sensors or other electric or electronic devices configured to indicate the status of a desired parameter or condition.

According to any preferred embodiment, the system provides a combination of subject matter configured to permit operation of a vehicle in a "pump and roll" mode while an auxiliary equipment unit is being operated by the vehicle's drive system by using an electrical circuit having logic that permits full pressurization of the parking brake cylinder to release the vehicle's brakes so that the vehicle may move when the throttle is depressed. Similarly, the logic results in reduced pressure applied to the parking brake cylinder for at least partial (e.g. modulated, etc.) application of the parking brake to stop the vehicle when the throttle is released by the operator so that separate application of the vehicle brakes by the operator is not required to stop the vehicle during the pump and roll mode. The conventional brake system components may be any suitable components configured to operate or interface with the components of the system.

According to alternative embodiments, the vehicle may be any suitable vehicle for which operation is desirable when auxiliary equipment is operated by the vehicle's drive system. Also, the auxiliary equipment may be any suitable equipment, such as but not limited to a generator, winch, hoist, drills, drivers, etc. The braking system may be a hydraulic system or a combined pneumatic-hydraulic system. The logic sequence of the electrical circuit may be configured to energize or de-energize the circuit based on the presence or absence of the predetermined conditions, to suit a particular application. The predetermined conditions may be selected according to the nature of the auxiliary equipment, actions indicative of a desire to move or stop the vehicle, or other desirable factors, such as, but not limited to safety criteria, etc. Further, the setting of the reduced pressure may be adjusted or varied to provide the desired braking responsiveness for the vehicle when the operator releases the throttle. According to other alternative embodiments, the presence or absence of the conditions and opening and closing of the logic devices may be provided by fluid signals (e.g., pneumatic, hydraulic, etc.) or by electronic or microprocessor controlled systems.

It is also important to note that the construction and arrangement of the elements of the braking system for a vehicle as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the operation of the interfaces may be reversed or otherwise varied, the length or width of the structures, components and/or members or other elements of the system may be varied. It should be noted that the components, elements and/or assemblies of the braking system for a vehicle may be constructed from any of a wide variety of materials and configurations for use with a wide variety of vehicles. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. A system for permitting movement of a vehicle having brakes while an auxiliary component of the vehicle is operated by the vehicle, comprising:
- a pressurized fluid source;
- a control device coupled to the pressurized fluid source and the brakes of the vehicle to release the brakes in response to a first signal and to at least partially apply the brakes in response to a second signal;
- a controller configured to apply the first signal to the control device when at least one of a first set of conditions exist and to apply the second signal to the control device when a second set of conditions exist;
- wherein the first set of conditions comprise one condition that the auxiliary component is off and another condition that a throttle is actuated.

2. The system of claim 1 wherein the second set of conditions comprise one condition that the auxiliary component is on and another condition that the throttle is released.

3. The system of claim 2 wherein the vehicle is permitted to move when the throttle is actuated and the vehicle is stopped by the brakes when the throttle is released.

4. The system of claim 1 wherein the auxiliary component comprises a pump.

5. The system of claim 1 wherein a first pressure is applied to a brake cylinder to permit release of the brakes when the controller applies the first signal to the control device.

6. The system of claim 5 wherein a second pressure less than the first pressure is applied to the brake cylinder to permit at least partial application of the brakes when the controller applies the second signal to the control device.

7. The system of claim 6 further comprising a pressure regulating device configured to maintain the second pressure within a predetermined range less than the first pressure.

8. The system of claim 6 wherein the second pressure is sufficient to permit a spring force to at least partially apply the brakes.

9. The system of claim 6 wherein the control device and the pressure regulating device are provided as an assembly.

10. A system for a vehicle having wheels with a brake and an engine-driven auxiliary unit, comprising:
- a first supply line having a first pressure;
- a second supply line having a second pressure
- a control device having a first inlet interfacing with the first supply line and a second inlet interfacing with the second supply line and an outlet interfacing with the brake device;
- a controller configured to provide one of a first signal and a second signal to the control device to transmit one of the first pressure and the second pressure to the brake device so that the brakes are movable between a first position to permit movement of the vehicle and a second position to arrest movement of the vehicle during operation of the auxiliary unit.

11. The system of claim 10 wherein the controller is configured to provide the first signal when at least one of a first set of conditions are present.

12. The system of claim 11 wherein the first set of conditions comprise an indication representative of a desire to move the vehicle.

13. The system of claim 11 wherein the first set of conditions comprise a first condition the auxiliary unit is not operating and a third condition that a throttle is actuated.

14. The system of claim 13 wherein the vehicle is movable during operation of the auxiliary unit when the third condition is present.

15. The system of claim 10 wherein the controller is configured to provide the second signal when a second set of conditions are present.

16. The system of claim 15 wherein the second set of conditions comprise an indication representative of a desire to stop the vehicle.

17. The system of claim 15 wherein the second set of conditions comprise a second condition that the auxiliary unit is operating and a fourth condition that a throttle is released.

18. The system of claim 17 wherein movement of the vehicle is stopped by the brake when the auxiliary unit is operating and the fourth condition is present.

19. The system of claim 17 wherein the fourth condition is present when a throttle position equal to or less that approximately 5 percent of a full-open throttle position.

20. The system of claim 10 wherein the vehicle is an aircraft rescue and fire fighting vehicle and the auxiliary unit is pump for delivering a fire suppression material.

21. An aircraft rescue and firefighting vehicle having an engine-driven pump configured to deliver a fire suppression material and a brake device, comprising:

a tubing network coupled to the vehicle and interconnecting a pressure source to an inlet of a control device and interconnecting an outlet of the control device to the brake device; and a controller interfacing with the control device for operation between a first position to release the brake device and permit movement of the vehicle when at least one of a first set of conditions representative of the pump and the vehicle are present, and a second position to at least partially apply the brake device to arrest movement of the vehicle when a second set of conditions representative of the pump and the vehicle are present;

wherein the first set of conditions comprises an indication that the pump is not delivering the fire suppression material.

22. The aircraft rescue and firefighting vehicle of claim 21 wherein the first set of conditions further comprises an indication that an operator of the vehicle desires to move the vehicle.

23. The aircraft rescue and firefighting vehicle of claim 21 wherein the second set of conditions comprises an indication that the pump is delivering the fire suppression material.

24. The aircraft rescue and firefighting vehicle of claim 23 wherein the second set of conditions further comprises an indication that an operator of the vehicle desires to stop the vehicle.

25. The aircraft rescue and firefighting vehicle of claim 21 wherein the controller is configured to send a first signal substantially free of voltage to the control device for operation in the first position and is configured to send a second signal having a predetermined voltage to the control device for operation in the second position.

26. The aircraft rescue and firefighting vehicle of claim 21 wherein the controller comprises a first logic device and a second logic device interfacing with an electrical circuit and configured to deenergize the control device when at least one of the first set of conditions are present and to energize the control device when the second set of conditions are present.

27. The aircraft rescue and firefighting vehicle of claim 21 wherein the condition representative of the vehicle comprises an indication of throttle position.

28. The aircraft rescue and firefighting vehicle of claim 27 wherein the brake device is applied when the throttle position does not exceed a predetermined position and the brake device is released when the throttle position exceeds the predetermined position.

29. The aircraft rescue and firefighting vehicle of claim 21 wherein the control device is a solenoid valve.

30. The aircraft rescue and firefighting vehicle of claim 21 wherein the tubing network comprises a first supply line having a first pressure and a second supply line having a second pressure.

31. The aircraft rescue and firefighting vehicle of claim 30 wherein the first pressure is within a range of approximately 120 psi to 140 psi.

32. The aircraft rescue and firefighting vehicle of claim 30 wherein the second pressure is within a range of approximately 20 psi to 40 psi.

33. The aircraft rescue and firefighting vehicle of claim 30 wherein the second supply line comprises a pressure regulating device configured to maintain the second pressure lower than the first pressure.

34. A pump and roll system for a vehicle having a fire suppression pump, the vehicle having an accelerator device to cause movement of the vehicle and a brake device configured to activate one or more brakes to stop the vehicle, comprising:

a pressurized fluid source;

a control device coupled to the pressurized fluid source and the brakes of the vehicle and operable between a first position to release the brakes for movement of the vehicle in a pump and roll mode when the accelerator device of the vehicle is actuated and a second position to at least partially apply the brakes to stop the vehicle when the accelerator device is released and the fire suppression pump is operating.

* * * * *